No 710,849. Patented Oct. 7, 1902.
E. DODD.
SPRING COUPLING PIN.
(Application filed Dec. 4, 1901.)

(No Model.)

WITNESSES:

INVENTOR
Edwin Dodd
BY
ATTORNEYS.

UNITED STATES PATENT OFFICE.

EDWIN DODD, OF ADELAIDE, SOUTH AUSTRALIA, AUSTRALIA.

SPRING COUPLING-PIN.

SPECIFICATION forming part of Letters Patent No. 710,849, dated October 7, 1902.

Application filed December 4, 1901. Serial No. 84,663. (No model.)

*To all whom it may concern:*

Be it known that I, EDWIN DODD, coach-builder, residing at 95 Waymouth street, Adelaide, in the State of South Australia and Commonwealth of Australia, have invented a certain new and useful Improved Spring Coupling-Pin; and I do hereby declare the following to be a full, clear, and exact description of the invention, such as will enable others skilled in the art to which it appertains to make and use the same.

This invention is a spring coupling-pin designed for coupling and securing together two parts, such as connecting the poles and shafts to a vehicle, or as in a D-shackle forming the coupling between two chains, rods, or parts of machinery. It is adapted to take the place in many instances of a bolt and nut, cotter or split pin, and various other devices, and especially of the bolt and screw-nut and other devices commonly employed to connect the pole and shafts to the lugs of a vehicle. The coupling-pin which I have designed is adapted to pass through the two eyes of a carriage-lug and the eye or eyes of the pole or shafts and is automatically retained securely in operative position by a spring-catch forming part thereof. The lugs or shackles may be formed substantially as at present used; and my invention consists of a pin with a spring extension and detaining-catch, all formed in one piece and capable of being inserted and withdrawn without the use of tools.

In order that my invention may be clearly understood, I will describe it with reference to the accompanying drawings.

Figure 2:
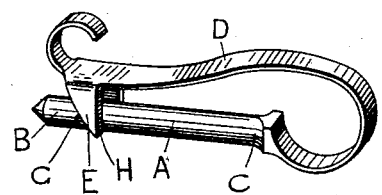
Figure 1:
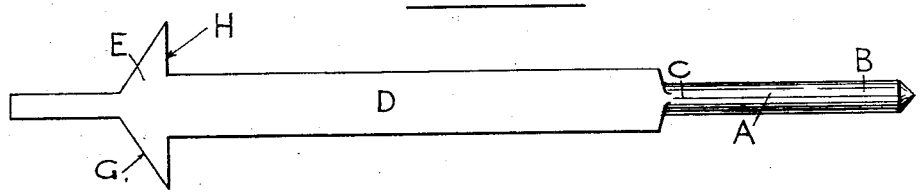

Figure 1 is a flat as cut and stamped from the steel rod. Fig. 2 represents the invention formed and complete.

I will for convenience describe my invention in reference to a carriage pole or shaft coupling, it being understood that with slight differences in proportions and strength it may be applied also to other purposes.

In my improved coupling the pin proper, A, is constructed of the same size and length as the ordinary lug-bolt. It has one end, B, free, and the other end, C, extended and lapped over in the form of a spring member D, which has near its free end a pair of downwardly-projecting clutch-teeth E, which project on each side of the pin near the free end. The faces G of the clutch-teeth nearer to the point of the pin are inclined, so as to slide over the lug or shackle arms, while the faces H of the clutch-teeth are at right angles to the pin, so that they fit over the inner arm of the shaft-lug, and so detain and hold the pin securely without the use of any screw-thread, nut, or detachable part. The holes or eyes in the arms of the vehicle-lug and the lug of the pole or shafts are plain, without any screw-thread. The spring extension D allows the clutch-teeth E to be lifted sufficiently to slip over the lugs as the pin is pushed into its place, when the clutch-teeth E are by the action of the spring returned to their normal position and by the vertical faces H hold the pin, and therefore the pole or shaft, securely to the lugs.

The pin, spring extension, and clutch-teeth are stamped or forged in one piece of the best spring-steel and are so proportioned, shaped, and tempered that when the pin is pushed in from either side the clutch-teeth slide over the shaft-lug and hold the pin securely in its position, as hereinbefore described. The pin can be used with the ordinary antirattlers or without, but does, in fact, stop the rattling either absolutely or to a very large extent. A convenient method of manufacture is with a suitable die or dies to cut and stamp out of seven-sixteenths-inch best round spring-steel a flat in the shape of Fig. 1 of the drawings, which while hot is by either hand or mechanical appliances turned over and into the form of Fig. 2 of the drawings and cooled and finished. The clutch-teeth E may be forced upward in the first stamping or subsequently.

A special feature of my invention is that, unlike some other methods proposed with the same object, there is no action whatever upon the spring from the motion of the horse or vehicle, but only in the passing of the pin originally into its position, and therefore the spring will wear as long as the bolt without the danger of weakening or breakage, and the life of the whole coupler is much longer than that of the ordinary bolt at present in use, while greater security is obtained.

It will be seen that this pin can be inserted and removed without the use of any tools whatsoever, but merely by lifting the spring with the hand.

Having now particularly described and ascertained the nature of my said invention and in what manner the same is to be performed, I declare that what I claim is—

A spring coupling-pin comprising a pin, a spring extending over said pin, and a pair of spaced clutch-teeth integral with the spring and arranged to straddle the pin, said clutch-teeth provided with beveled edges adjacent to the end of the pin and with straight edges on the opposite side.

In witness whereof I have hereunto set my hand in the presence of two witnesses.

EDWIN DODD.

Witnesses:
CHARLES NICHOLAS COLLISON,
WILLIAM SPEAKMAN HANSON.